US012159229B2

(12) United States Patent
AlRegib et al.

(10) Patent No.: US 12,159,229 B2
(45) Date of Patent: Dec. 3, 2024

(54) TRANSFER LEARNING FOR MEDICAL APPLICATIONS USING LIMITED DATA

(71) Applicants: Georgia Tech Research Corporation, Atlanta, GA (US); Ghassan AlRegib, Atlanta, GA (US); Melvin Julian Mathew, Atlanta, GA (US); Dogancan Temel, Atlanta, GA (US)

(72) Inventors: Ghassan AlRegib, Atlanta, GA (US); Melvin Julian Mathew, Atlanta, GA (US); Dogancan Temel, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 450 days.

(21) Appl. No.: 17/610,335

(22) PCT Filed: May 29, 2020

(86) PCT No.: PCT/US2020/035167
§ 371 (c)(1),
(2) Date: Nov. 10, 2021

(87) PCT Pub. No.: WO2020/243460
PCT Pub. Date: Dec. 3, 2020

(65) Prior Publication Data
US 2022/0222817 A1    Jul. 14, 2022

Related U.S. Application Data

(60) Provisional application No. 62/853,753, filed on May 29, 2019.

(51) Int. Cl.
*G06N 3/08* (2023.01)
*G06T 7/00* (2017.01)
(Continued)

(52) U.S. Cl.
CPC ............. *G06N 3/08* (2013.01); *G06T 7/0012* (2013.01); *G06T 7/73* (2017.01); *G06V 10/454* (2022.01);
(Continued)

(58) Field of Classification Search
CPC ........ G06N 3/08; G06N 3/045; G06T 7/0012; G06T 7/73; G06T 2207/20081;
(Continued)

(56) References Cited

PUBLICATIONS

Christopher, M., Belghith, A., Bowd, C., Proudfoot, J.A., Goldbaum, M.H., Weinreb, R.N., Girkin, C.A., Liebmann, J.M. and Zangwill, L. M., 2018. Performance of deep learning architectures and transfer learning for detecting glaucomatous optic neuropathy in fundus photographs. Scientific reports, 8(1), p. 16685.*

(Continued)

*Primary Examiner* — Zhitong Chen
(74) *Attorney, Agent, or Firm* — Bryan W. Bockhop; Bockhop Intellectual Property Law, LLC

(57) ABSTRACT

In a method of generating a neural network used to detect a feature of medical significance from a body image data input, test data images (110) are divided into patches (120). Each patch is labelled as either corresponding to the feature (124) or not corresponding to the feature (122). One trained fully connected layer (136) in a pretrained general purpose convolutional neural network (130) is replaced with a new fully connected layer. The pretrained convolutional neural network (130) is retrained with the set of labelled patches (126) to generate a feature-specific convolutional neural network that includes at least one feature-specific fully connected layer (152) that maps the body image data to the feature of medical significance when the feature of medical significance is present in the body image data input.

10 Claims, 4 Drawing Sheets

(51) Int. Cl.
  *G06T 7/73* (2017.01)
  *G06V 10/44* (2022.01)
  *G06V 10/774* (2022.01)
  *G06V 10/82* (2022.01)
  *G06V 40/18* (2022.01)
(52) U.S. Cl.
  CPC .......... *G06V 10/7747* (2022.01); *G06V 10/82* (2022.01); *G06V 40/193* (2022.01); *G06T 2207/20081* (2013.01); *G06T 2207/20084* (2013.01); *G06T 2207/30024* (2013.01); *G06T 2207/30041* (2013.01)
(58) Field of Classification Search
  CPC . G06T 2207/20084; G06T 2207/30024; G06T 2207/30041; G06V 10/454; G06V 10/7747; G06V 10/82; G06V 40/193; G06V 2201/031; G06F 18/2414
  See application file for complete search history.

(56) References Cited

PUBLICATIONS

De Matos, J., Britto Jr, A.D.S., Oliveira, L.E. and Koerich, A.L., 2019. Double Transfer Learning for Breast Cancer Histopathologic Image Classification. arXiv e-prints, pp.arXiv-1904.*

* cited by examiner

TRANSFER LEARNING FOR MEDICAL APPLICATIONS USING LIMITED DATA

CROSS-REFERENCE TO RELATED APPLICATION(S)

This application claims the benefit of U.S. Provisional Patent Application Ser. No. 62/853,753, filed May 29, 2019, the entirety of which is hereby incorporated herein by reference.

BACKGROUND OF THE INVENTION

1. Field of the Invention

The present invention relates to medical sensing systems and, more specifically, to a medical feature detection system employing a convolutional neural network.

2. Description of the Related Art

Detecting features of medical significance, such as locations of physiological structures or abnormalities, can be difficult. Many different types of imaging systems can assist a researcher or diagnostician making such detections. For example, cameras (e.g., digital CMOS cameras), heat spectrum analyzers, thermal radiation sensors, scanning devices (e.g., MRI/CAT scanners, etc.) and biometric sensors are frequently used to assist in finding such features. However, the researcher or diagnostician must still review the output from such devices to make decisions about such features and such review can involve a timely and complicated process.

Recently, some researchers have employed various artificial intelligence (AI) constructs to assist in detecting such features. However, use of AI constructs in medical feature identification is still in its early stages.

One AI construct employs classification models in feature detection to detect common items, such as in facial recognition. Such classification models can employ convolutional neural networks (CNNs) for image recognition, which can be trained with thousands of general images and used to detect images that belong to known classes into which the general images have been classified. Visual representations learned by CNN models include low level characteristics based on edges and shapes. CNNs include convolutional layers that learn visual representations and fully connected layers that map these visual representations to target classes. Typically, once such a system has been trained, an image of interest can be fed into the system for identification. The system will break the image down into granular features and relationships between such features, compare the features and relations to features and relationships distilled from the training images and then output the probability of the image of interest belonging to each of the classes in the system.

However, pretrained classification models trained for large scale generic visual recognition tasks are not generally used for recognizing or localizing regular or abnormal structures in medical images because they are inherently trained for generic object classes, which typically do not include structures from the medical images. Therefore, they do not provide useful information regarding specific features of medical interest in an image. Because of the massive amount of computational time involved in CNN training, training a new CNN with only medical images could be time consuming and expensive.

Therefore, there is a need for a system for employing pretrained CNNs in detecting features of medical interest.

SUMMARY OF THE INVENTION

The disadvantages of the prior art are overcome by the present invention which, in one aspect, is a method of generating a neural network used to detect a feature of medical significance from a body image data input, in which each of a plurality of test data images is divided into a matrix of patches. Each of the plurality of test data images corresponds to a region in which the feature is found. Each patch is labelled as either corresponding to the feature if a portion of the feature is shown in the patch or as not corresponding to the feature if no portion of the feature is shown in the patch. As a result, a set of labelled patches is generated. At least one trained fully connected layer in a pretrained general purpose convolutional neural network is replaced with a new fully connected layer. The pretrained general purpose convolutional neural network is retrained with the set of labelled patches so as to generate a feature-specific convolutional neural network that includes at least one feature-specific fully connected layer that is adapted to map the body image data to the feature of medical significance when the feature of medical significance is present in the body image data input.

In another aspect, the invention is a method of detecting a feature of medical significance from a body image data input, in which each patch of a plurality of feature-specific test data images is labelled into one of two classifications, including a first classification in which at least a portion of the feature is present in the patch and a second classification in which no portion of the feature is present in the patch. As a result, a plurality of labelled patches is generated. Transfer learning is employed to train a pretrained convolutional neural network with the plurality of labelled patches so as to generate a convolutional neural network including a feature specific fully connected layer. Each of a plurality of test images that include patches in which a portion of the feature is shown in the patch and patches in which no portion of the feature is shown with the feature-specific convolutional neural network is mapped to a set of target results correlating each test image to a probability of the feature of medical significance being present in the test image and not being present in the test image. The feature-specific convolutional neural network is retrained when the probability of a correct result is below a predetermined threshold. The feature specific fully connected layer is employed to determine if a probability that the body image data input exhibits the feature is greater than a predetermined threshold.

In yet another aspect, the invention is a device for detecting a feature of medical significance in a body that includes an imaging device configured to collect image data of a portion of the body. A processor includes a feature-specific trained convolutional neural network, which includes a pretrained general purpose convolutional neural network that has been pretrained with a plurality of non-feature specific images and that has been further trained with a plurality of images that include patches in which each patch has been labelled as associated with the feature if at least a portion of the feature appears in the patch and as not associated with the feature if no portion of the feature appears in the patch. The processor applies the image data of a portion of the body to the feature-specific trained convolutional neural network and indicates a likelihood of the feature of medical significance being in the portion of the body.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
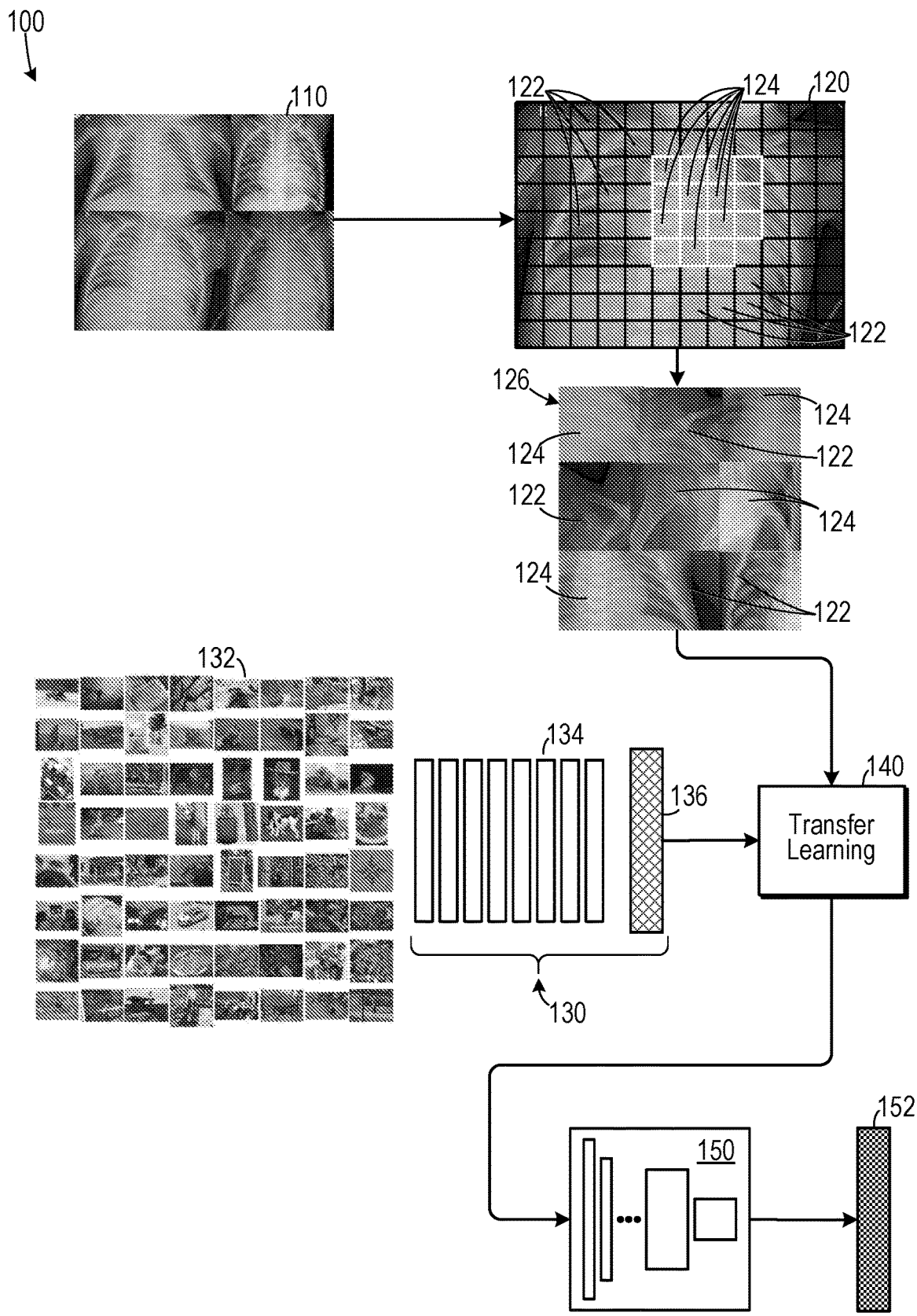
FIG. 1 is a schematic diagram of one embodiment directed to detecting features in chest images.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Convolutional neural networks (CNNs) and methods for training CNNs are disclosed in U.S. Pat. No. 7,747,070, issued to Puri, and US Patent Publication No. 2015/0036920, filed by Wu et al., which are all incorporated herein by reference for the purpose of disclosing CNNs and the methods of training the same. Transfer learning in a CNN is disclosed in U.S. Pat. No. 10,460,440, issued to Zhang et al., which is incorporated herein by reference for the purpose of disclosing transfer learning in a CNN.

While pretrained classification models trained for large scale generic visual recognition tasks are not generally used for recognizing or localizing regular or abnormal structure in medical images because they are inherently trained for generic object classes, one embodiment of the invention retrains an existing CNN for use in identifying features of medical interest by employing limited retraining and transfer learning. The visual representations that pretrained generic CNN models have learned can still be useful for recognizing regular or abnormal structures in medical images. Specifically, low level characteristics including edges and shapes can be used to identify structures in medical images. To use pretrained models, one embodiment trains only the final classifier layer (i.e., fully connected layer) with a limited number of images compared to the large-scale image set used in the original training. Then, the embodiment uses the new models to localize regular and abnormal structures over target dataset. One embodiment employs one of three pretrained object recognition models along with a limited dataset to obtain a detector for a medical condition.

As shown in FIG. 1, in one embodiment of a medical feature detection system 100, a plurality of test data (i.e., training) images 110 taken from the region of interest (which, in the example shown are x-ray images of different patient's chests) are each divided into a set of patches 120 in which each patch is labelled as either including at least a portion of the feature of interest 124 or not including the feature of interest 122, which results in the generation of a set 126 of labelled patches.

A pretrained convolutional neural network (CNN) 130 includes a plurality of convolutional layers 134 and at least one fully connected layer 136 that have been pretrained typically with thousands of images 132 of a general nature (e.g., dogs, cars, houses, people, patterns, etc.). As a result, the convolutional layers 134 include distilled features from these images. Such features may include lines of different orientation, various areas of shading, etc. The pretrained fully connected layer 136 is replaced and the system is re-trained with the set 126 of labelled patches relating to the medical feature of interest using transfer learning 140. In this process, a visual representation extractor 150 generates a new fully connected layer 152 that includes feature-specific information about the feature of medical interest extracted from the set 126 of labelled patches. The resulting fully connected feature-specific layer 152 can then employ the entire retrained CNN to map an image of interest onto the feature-specific layer 152 to detect when the feature of interest is present in an image of interest or not.

Figure 2A:
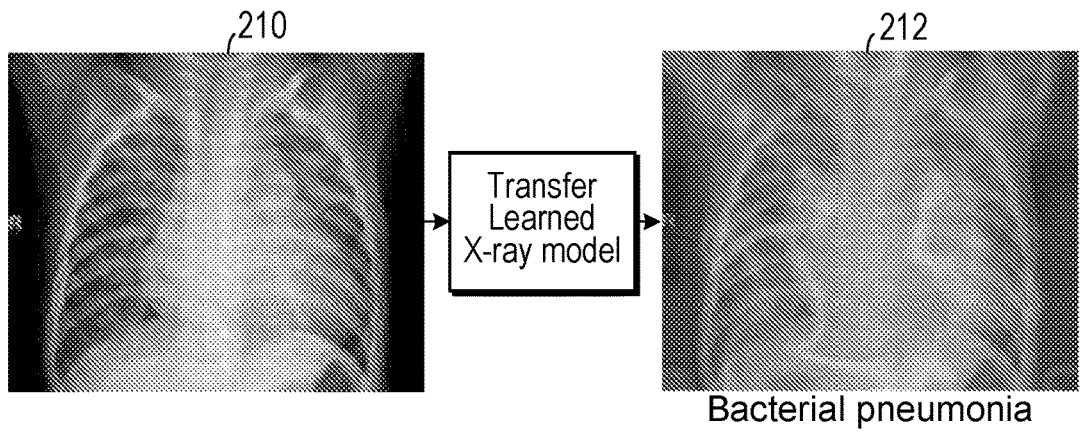
FIGS. 2A-2C are a series of images demonstrating transfer learned models in chest images.
Figure 2B:
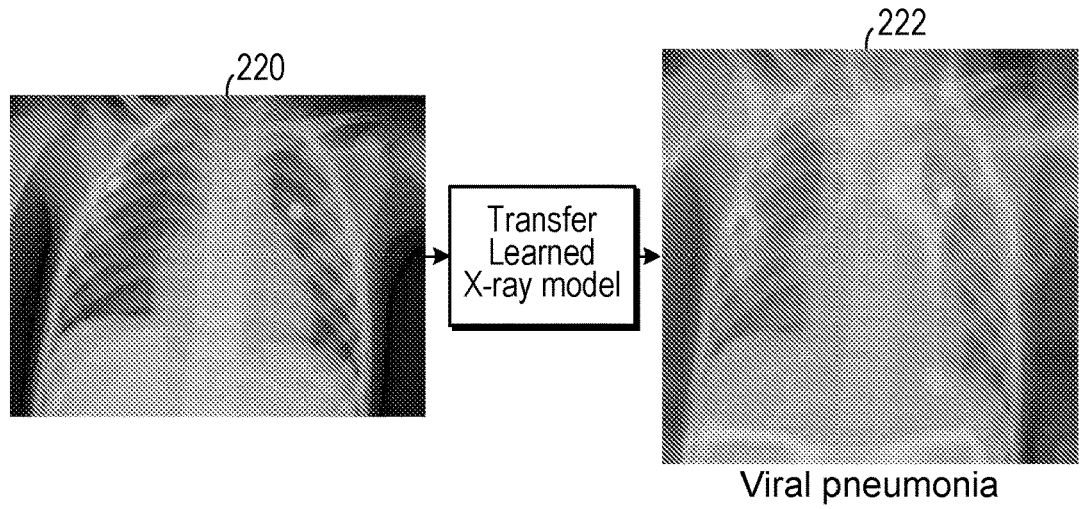
Figure 2C:
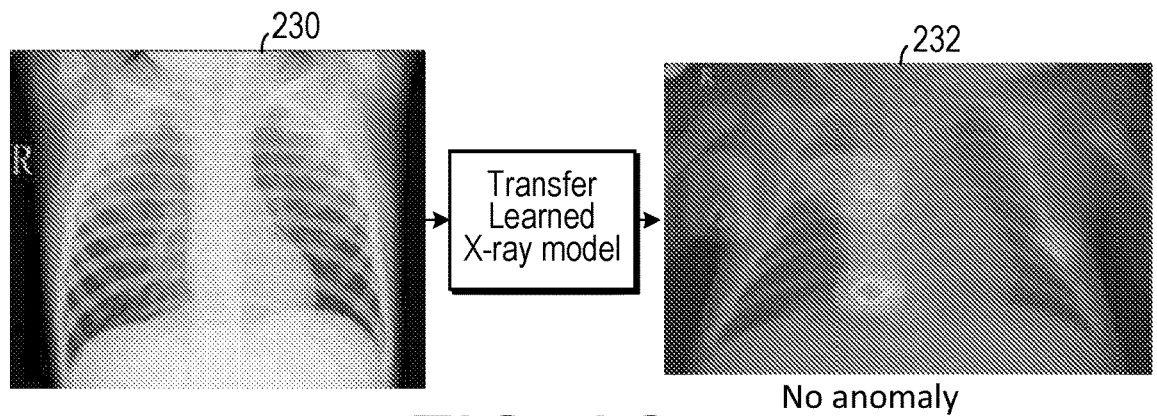

For example, as shown in FIGS. 2A-2C, when detecting the presence of bacterial or viral pneumonia, the CNN can be trained with chest x-ray images 210 showing bacterial pneumonia, chest x-ray images 220 showing viral pneumonia and normal (no anomaly) images 230. These can be trained into a transfer learned x-ray model to a layer that includes a bacterial pneumonia model 212, a viral pneumonia model 222 and a no anomaly model 232.

Once trained, the user can further train the system by mapping test images, which include patches in which a portion of the feature is shown in the patch and patches in which no portion of the feature is shown with the feature-specific convolutional neural network, to a set of target results. When the CNN correlates each test image to a probability of the feature of medical significance being present in the test image and not being present in the test image, the user can retrain the feature-specific CNN when the determined probability of a correct result is below a predetermined threshold (or when the determined probability of an incorrect result is above a threshold).

In one embodiment, the feature of medical significance can include a medical image of tissue and each patch can be labelled "healthy/normal" when the patch shows healthy tissue and "not healthy/abnormal" when the patch shows not healthy tissue. For example, in a kidney tumor detecting CNN, the CNN can be trained with images (e.g., MRI or CT images) of both healthy/normal kidneys and kidneys with a tumor (i.e., "not healthy/abnormal"). In use, a diagnostician can input a scan of a patient's kidney and the CNN will map the scanned image onto the training images and generate a probability as to whether or not the kidney has a tumor.

Figure 3:
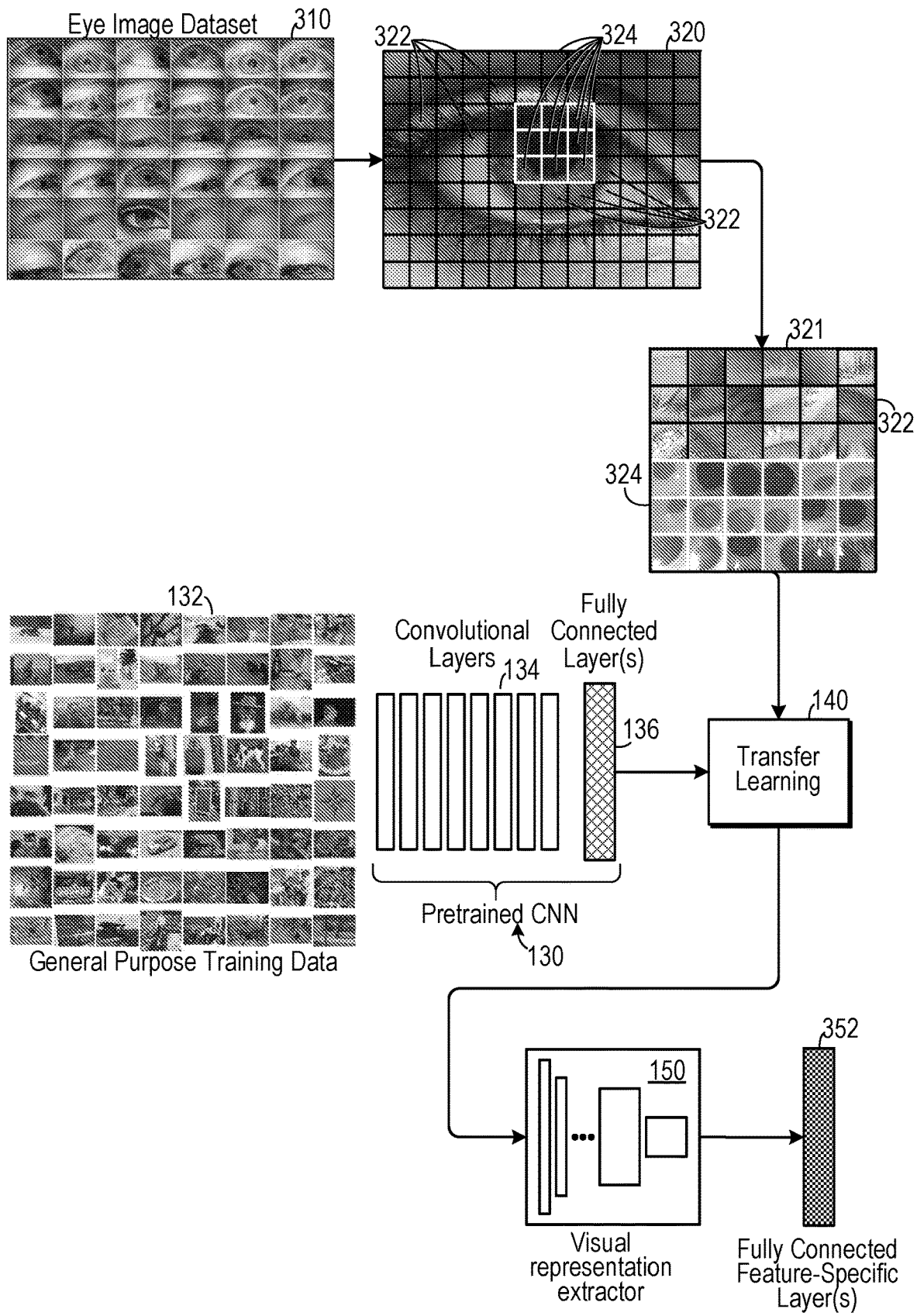
FIG. 3 is a schematic diagram of one embodiment directed to detecting features in eye images.

In another embodiment, as shown in FIG. 3, the feature of medical interest could be the pupil of an eye and the training images 310 could be camera pictures of eyes. Each eye picture 320 could be divided into "pupil" patches 324 and "no pupil" patches 322. The CNN is then retrained using the labelled patch set 321 so as to generate a pupil-specific fully connected layer 352. This layer could be used, for example, in an automatic system for detecting reactions of a patient's pupils to stimuli, such as light.

Figure 4:
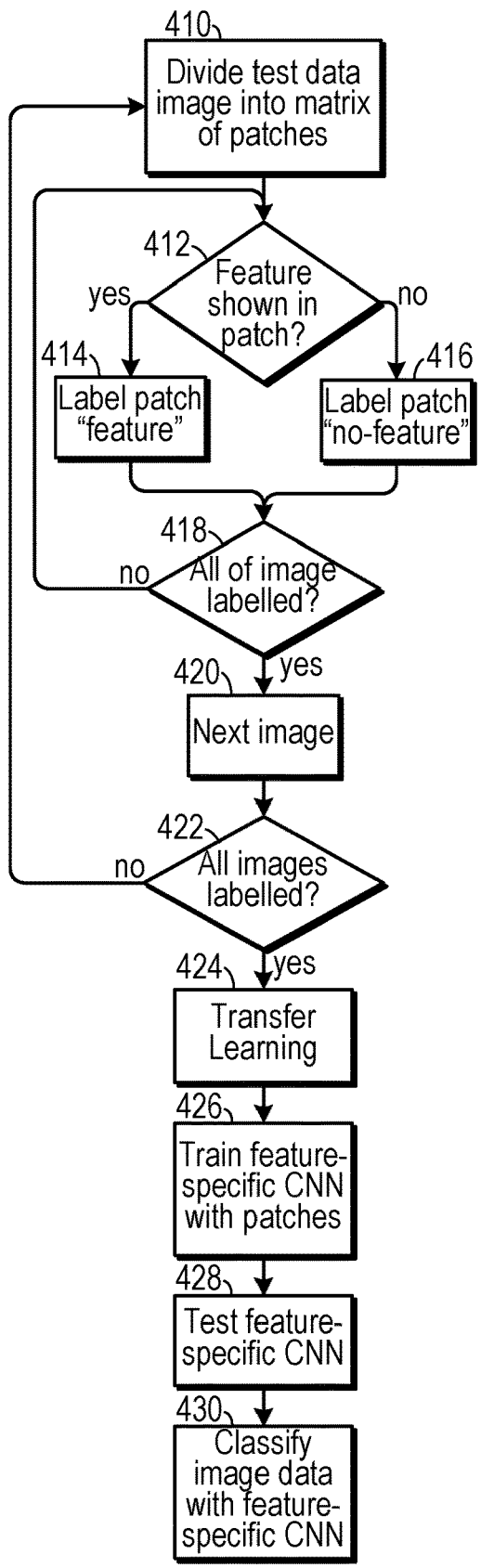
FIG. 4 is a flow chart demonstrating one method of generating a feature-specific convolutional neural network.

As shown in FIG. 4, one embodiment generally employs a method of: dividing test data images of the area of the feature into a matrix of patches 410 and if the feature is shown in a patch 412 the patch is labelled 414 with an indicator that the feature is present, otherwise it is labelled 416 with an indicator that the feature is not present. Once all of the patches in a test image have been labelled 418, the next image is examined 420. Once all images have been labelled 422, the system applies transfer learning 424 to the CNN and the CNN is trained 426 with the feature-specific patches. The CNN is tested with test data 428 and, once it has been properly adjusted, the CNN can be used to classify image data with the feature-specific CNN 430.

Figure 5:
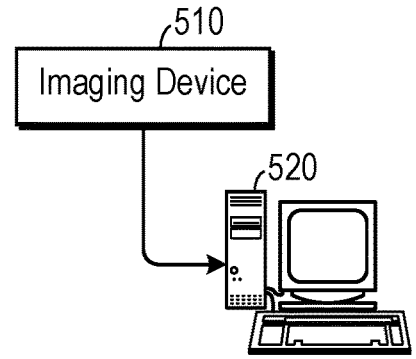
FIG. 5 is a schematic diagram of one example of an apparatus that can be used in association with a feature-specific convolutional neural network.

As shown in FIG. 5, the system can employ an imaging device 510, which could be one of many imaging devices used in medical imaging, including (but not limited to): a camera, a heat spectrum detector, a thermal radiation detector, a scanner, and a biometric sensor. Data from the imaging device 510 is sent to a processor 520 that includes a tangible computer readable memory and that is programmed to perform all of the steps disclosed above. The processor 520 can include a stand-alone computer or it can be a processor or programmable controller that is embedded in a diagnostic device. Typically, all or most of the CNN processing functions can be performed on a graphics processing unit (GPU)-type processor.

Examples of suitable general purpose CNNs include AlexNet, VGG, and ResNet. In an AlexNet, there are five convolutional layers and three fully connected layers. The size of the convolutional layers varies between 11×11, 5×5, and 3×3. In a VGG, convolutional layers (3×3) are stacked on top of each other to obtain abstract visual representations. The original VGG architecture has 8 convolutional layers and 3 fully connected layers. In a ResNet, convolutional layers are mostly 3×3 filters other than the first layer (7×7). Even though ResNet is deeper than VGG, it has fewer filters and lower complexity thanks to its skip connections. One experimental embodiment uses the baseline version of a ResNet with 18 convolutional layers and a single fully connected layer.

One experimental embodiment fine-tuned a pretrained AlexNet convolutional neural network to perform classification on a new collection of images. The AlexNet generic CNN was trained on over a million images and can classify images into 1000 object categories (such as keyboard, coffee mug, pencil, and many animals). This network takes an image as input and outputs a label for the object in the image together with the probabilities for the image being a member of each of the object categories.

Transfer learning is commonly used in deep learning applications. One can take a pretrained network and use it as a starting point to learn a new task. Fine-tuning a network with transfer learning is usually much faster and easier than training a network with randomly initialized weights from scratch. One can quickly transfer learned features to a new task using a smaller number of training images.

One experimental embodiment used in pupil detection employed pretrained versions of these architectures, which were trained with ImageNet to classify generic objects into 1,000 classes. These object recognition models were transformed into pupil detectors with transfer learning as shown in FIG. 3. Specifically, the embodiment kept the convolutional layers that output visual representations and excluded all of the pretrained fully connected layers at the end of AlexNet, VGG, and ResNet. Then a single fully connected layer was added to map visual representations in the final layer to two classes as pupil and no pupil. In the training, all the convolutional layers were frozen, and the fully connected layer was trained with image patches labeled as pupil and no pupil. A total of 3,620 images were used. Hundreds of thousands of images were used in the pretrained models of AlexNet, VGG, and ResNet, whereas only used a few thousand images were used to transform generic models into the target application.

Transfer learning of AlexNet, VGG, and ResNet resulted in three pupil detection models denoted as AlexNet-P, VGG-P, and ResNet-P in which P stands for pupil. To localize pupils in an image, the image was scanned with overlapping patches and each patch was classified as "pupil" or "no pupil" using the pupil detection models. After obtaining a class for each patch, the pupil patches were sorted based on their classification confidence and the median location of the top-5 pupil patches was computed with the highest confidence. In recognition tasks, top-5 accuracy is a commonly used metric, which considers recognition as correct if the target class is among the top-5 estimates. Similarly, the experimental embodiment looked at the top-5 estimates, but instead of focusing on one estimate, the median location of all 5 estimates was obtained. A patch-based localization was used instead of bounding box-based detection because dataset annotations only included pupil centers.

The following are details about the overall system employed in one experimental embodiment:

(1) In one aspect, the housing can be configured to be portable. In a portable configuration, the housing can be affixed to the patient's body using a harness. In another aspect, the housing be stabilized in a non-portable configuration. In the nonportable configuration, the housing can be affixed to a fixed surface or movable base using a control arm. For example, one end of the control arm can be coupled to a wall, a floor or a movable base; the other end of the arm can be coupled to the housing. In a further aspect, the control arm can be controllable by the controller such that the housing in free space can be manipulated. For example, plurality of controllable servo motors can be attached to the arm. Further, the controller can send instructions to the servomotor to orient the housing in frees pace. In this embodiment, the harness can be configured to ensure that the patient's eyes maintain an interface with the housing.

(2) The housing can also comprise at least one imager for each cavity. Within a respective cavity, the imager is oriented to take images of patient's body. The imager can be oriented on a gimbal. In a further aspect, the gimbal structure can also be controllable by the controller to adjust the location of the imager within the cavity. The imager can be moved along the walls of the cavity to adjust the angle and distance of an image captured by the imager without requiring movement of the patient. In an aspect, the gimbal can allow the imager to have increased range of motion along the X-Y plane within the cavity. Similarly, the gimbal can increase the range of motion in the X-Z plane and Y-Z plane. Further, the gimbal can allow rotation around X, Y and Z axes oriented in the cavity. In yet another aspect the imager gimbal can be motorized and controllable by the controller.

(3) In other aspects, the imager can employ a visible light camera, such as an RGB camera, that captures luminance and chrominance components. In yet another aspect, the imager can be an apparatus that captures the infrared light.

The imager can be a night vision camera. In a further aspect, the imager can be an apparatus that captures the heat spectrum and the thermal radiation of the imaged objects. In another embodiment, the imager can be an apparatus that captures depth field and the entire light field in a three-dimensional fashion. In yet another aspect, the imager can be an apparatus that capture the motion field. In another aspect, the imager can be an apparatus that captures light and distance range. In further yet another aspect, imager can be an apparatus that detects and images microscopic structures. In yet another aspect, imager can be a microscopic sensor.

(4) In yet another aspect, a plurality of imagers can be dispersed in the cavity. The plurality of imagers can be displaced at various locations and angles in the cavity to provide a greater variety of images. The controller can be further configured to use the plurality of images from the plurality of imagers to generate various views such as three-dimensional views of the targeted region. Further, all of these images can be processed by the controller and stored on a non-transitory medium. In other aspects, the images can be transmitted to an external storage device, such as a third party storage database or the external storage system for manipulation by the GUI. In yet another aspect, the GUI can be coupled to an exterior portion of the housing.

(5) The communication module can facilitate data transfer between the housing and an external system. In one aspect, the data transfer can be facilitated by antennae. The communication module can further include a speaker and a microphone to facilitate two-way communication with a patient that is interfacing with the system. In addition, the microphone feature can be used by the patient to provide feedback to a potential health care provider. In a further aspect, the communication module can facilitate communication between a patient and healthcare provider when the two are in different locations. The communication module can interface with any type of computer networking arrangement used to exchange data in a localized area, such as WiFi, Bluetooth Ethernet, and other suitable network connections that enable components of system to interact with other systems. The communications module can also facilitate communication with external networks such as internet, a private data network or virtual private network using a public network.

(6) The controller can be configured to control a plurality of components for the system. In an aspect, the controller can receive instructions from a storage medium to execute imaging. In a further aspect, the system can comprise a plurality of controllers wherein each controller can be tasked with a particular task for operating the system. For example, the controller can include one or more of a microprocessor, microcontroller, digital signal processor, co-processor or the like or combinations thereof. The controller can include a single core or multiple core processor that executes parallel processes simultaneously. For example, the controller can be a single core controller that is configured with virtual processing technologies. In certain embodiments, controller can use logical processors to simultaneously execute and control multiple processes. The controller can implement virtual machine technologies, or other similar known technologies to provide the ability to execute, control, run, manipulate, store multiple software processes, applications, programs, etc. The one or more processors of the controller can host a set of instructions that analyze acquired images from the imager and stores the analysis results in the memory or use the results to create new instructions to the controller. Other types of processor arrangements could be implemented that provide for the capabilities disclosed herein.

(7) The memory can comprise implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data.

(8) In a further aspect, controller, the imager and memory be can used to capture images for subsequent identification. Captured images can be analyzed to identify the individual. The imager can be any apparatus that captures different bands of the light field. Captured images by an imager can be analyzed to identify the individual based on one or more factors including but not limited to visual cues, motion cues, reflexes, thermal distribution, microscopic structures, or any such factors. Further, the identification mechanism can be used to track the history of the medical conditions and, subsequently, enable progression tracking of one or more medical condition and medication compliance. In another aspect, the identification mechanism can be used as a login mechanism to access certain functionalities and personalized features in the device.

(9) The system can also include interface ports. In an aspect, the interface ports can be configured to output or receive data. For example, the interface port can be a USB drive allowing for the direct connection to a printer. The interface ports can include hardware, firmware and/or software that enables communication with various peripheral devices, such as media drives (e.g., magnetic disk, solid state, or optical disk drives), other processing devices. In some embodiments, the interface ports can include a serial port, a parallel port, a general-purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof. The system can be powered by a sufficient battery source to remain portable. In another embodiment the system can be powered by a corded connection to an outlet.

The system can recognize, localize, and classify regular and abnormal structures in medical images through transfer learning with limited data. The system can be adapted to new clinical applications by feeding sample images with annotations, which will be used to transform generic classification models into new classification and localization models for the target application. Sample images can be captured with the proposed system and annotated by the users or captured images with annotations can be directly fed to the proposed system. Pretrained models in the system can be used for the target application or new classification models can be uploaded to the system.

The system can include a housing that includes an imaging system. At least one imager can be oriented to capture an image of a patient's body, or a portion thereof. The system can also include at least one controller that includes at least one processor and a non-transitionary computer readable medium storing instruction that, when executed by the processor, cause the controller to retrieve image data from at least one imager or memory and perform regular and abnormal structure recognition and localization, a learning module, an image classification module and an image localization module.

The learning module can employ limited data and user annotations and include: pretrained models for generic visual classification tasks; an input module that can receive new pretrained classification models; an input module that can receive previously captured images uploaded by the user or new images from the imaging module along with location and type annotation corresponding to the target structure; and a transfer module that adapts pretrained classification models to regular and abnormal structure detectors for target application through the limited number of images and annotations provided by the input module. As used with respect to this embodiment, "limited" means less than original dataset used to obtain the pretrained models.

The classification module can include a retrained classification module using transfer learning; and a confidence module that can assess the confidence of classification decisions.

The localization module can include: a scanning module that can scan the entire image and classify scanned regions by using the classification modules; a confidence module that can assess the confidence of classification decisions; and a localization procedure based on the confidence of the scanned regions.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. § 112(f) unless the words "means for" or "step for" are explicitly used in the particular claim. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method of generating a neural network used to detect a feature of medical significance from a body image data input, comprising the steps of:
   (a) dividing each of a plurality of test data images into a matrix of patches, wherein each of the plurality of test data images corresponds to a region in which the feature is found;
   (b) labelling each patch as either corresponding to the feature if a portion of the feature is shown in the patch or as not corresponding to the feature if no portion of the feature is shown in the patch so as to generate a set of labelled patches;
   (c) replacing at least one trained fully connected layer in a pretrained general purpose convolutional neural network with a new fully connected layer;
   (d) retraining the pretrained general purpose convolutional neural network with the set of labelled patches so as to generate a feature-specific convolutional neural network that includes at least one feature-specific fully connected layer that is adapted to map the body image data to the feature of medical significance when the feature of medical significance is present in the body image data input;
   (f) mapping each of a plurality of test images that include patches in which a portion of the feature is shown in the patch and patches in which no portion of the feature is shown with the feature-specific convolutional neural network to a set of target results correlating each test image to a probability of the feature of medical significance being present in the test image and not being present in the test image; and
   (g) retraining the feature-specific convolutional neural network when the probability of a correct result is below a predetermined threshold.

2. The method of claim 1, wherein the feature of medical significance comprises a medical image of tissue.

3. The method of claim 2, wherein each patch is labelled "healthy/normal" when the patch shows healthy tissue and "not healthy/abnormal" when the patch shows not healthy tissue.

4. The method of claim 1, wherein the body image data input comprises a digital photograph that includes an image of an eye that is obtained using a device selected from a list of devices consisting of: a camera, a heat spectrum detector, a thermal radiation detector, a scanner, and a biometric sensor.

5. The method of claim 1, wherein the feature of medical significance comprises a pupil of an eye.

6. The method of claim 5, wherein each patch is labelled "no pupil" when no portion of the pupil appears in the patch and "pupil" when a portion of the pupil appears in the patch.

7. The method of claim 5, further comprising the steps of:
   (a) inputting into the feature specific convolutional neural network an image of an eye; and
   (b) determining a plurality of locations of outer boundaries of the pupil based on whether patches from the image of the eye are classified as "pupil" or "no pupil".

8. The method of claim 7, further comprising the steps of:
   (a) stimulating the eye in a predetermined manner; and
   (b) measuring a reaction of the eye to a stimulation using the feature specific convolutional neural network.

9. The method of claim 1, wherein the body image data input comprises a digital photograph that includes an image of an eye.

10. A method of detecting a feature of medical significance from a body image data input, comprising the steps of:
    (a) labelling each patch of a plurality of feature-specific test data images into one of two classifications, including a first classification in which at least a portion of the feature is present in the patch and a second classification in which no portion of the feature is present in the patch, thereby generating a plurality of labelled patches;

(b) employing transfer learning to train a pretrained convolutional neural network with the plurality of labelled patches so as to generate a convolutional neural network including a feature specific fully connected layer;

(c) mapping each of a plurality of test images that include patches in which a portion of the feature is shown in the patch and patches in which no portion of the feature is shown with the feature-specific convolutional neural network to a set of target results correlating each test image to a probability of the feature of medical significance being present in the test image and not being present in the test image;

(d) retraining the feature-specific convolutional neural network when the probability of a correct result is below a predetermined threshold; and (e) employing the feature specific fully connected layer to determine if a probability that the body image data input exhibits the feature is greater than a predetermined threshold.

* * * * *